United States Patent [19]

Sharp

[11] 4,009,503
[45] Mar. 1, 1977

[54] WIPER BLADE UNIT WITH FASTENING CLIP

[75] Inventor: Bernard C. Sharp, White Plains, N.Y.

[73] Assignee: Parker-Hannifin Corporation, Shelton, Conn.

[22] Filed: Mar. 31, 1976

[21] Appl. No.: 672,245

[52] U.S. Cl. .......................................... 15/250.42
[51] Int. Cl.² ........................................... B60S 1/04
[58] Field of Search .................... 15/250.36–250.42

[56] References Cited

UNITED STATES PATENTS

| | | | |
|---|---|---|---|
| 3,866,261 | 2/1975 | Stratton | 15/250.42 |
| 3,879,794 | 4/1975 | Roberts, Jr. | 15/250.42 |
| 3,885,265 | 5/1975 | Deibel et al. | 15/250.42 |
| 3,919,736 | 11/1975 | Bourassa et al. | 15/250.42 |
| 3,952,360 | 4/1976 | Plisky et al. | 15/250.42 |

*Primary Examiner*—Peter Feldman
*Attorney, Agent, or Firm*—Albert C. Johnston; Gerard F. Dunne

[57] ABSTRACT

A replaceable wiper blade unit to be received within the claws of a windshield wiper blade holder includes a longitudinally hollow backing strip slotted along its bottom for receiving an elastic wiper blade, and having along its opposite sides laterally open channels defined between upper and lower lateral flange, with an especially formed and attached resilient metal clip on an end of the backing strip for fastening it detachably to a set of claws. The clip includes a base portion to underlie an end portion of the strip, two resilient legs extending forwardly from the base portion, each beneath a lower flange, an upturned ridge portion protruding from a forward portion of each leg into a respective channel through an opening in the lower flange, and side structures turned upwardly from opposite side edges of the base portion to provide a finger crimped over and upon each lower flange and a claw abutting finger in each channel. The ridge portion of each leg has a raked backward surface to hold a claw, and the legs have ledge portions along their outer edges for finger engagement to release engaged claws.

13 Claims, 9 Drawing Figures

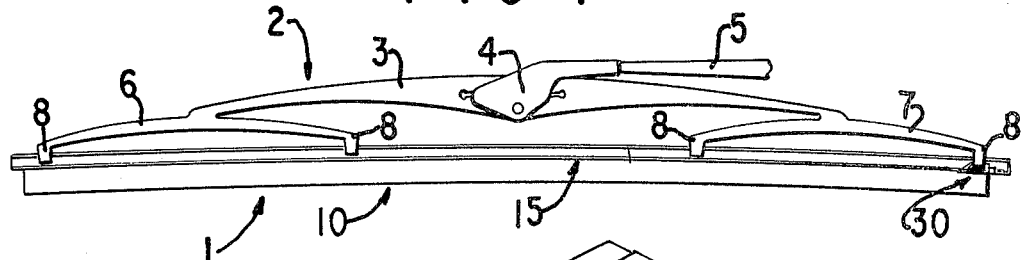
FIG.1
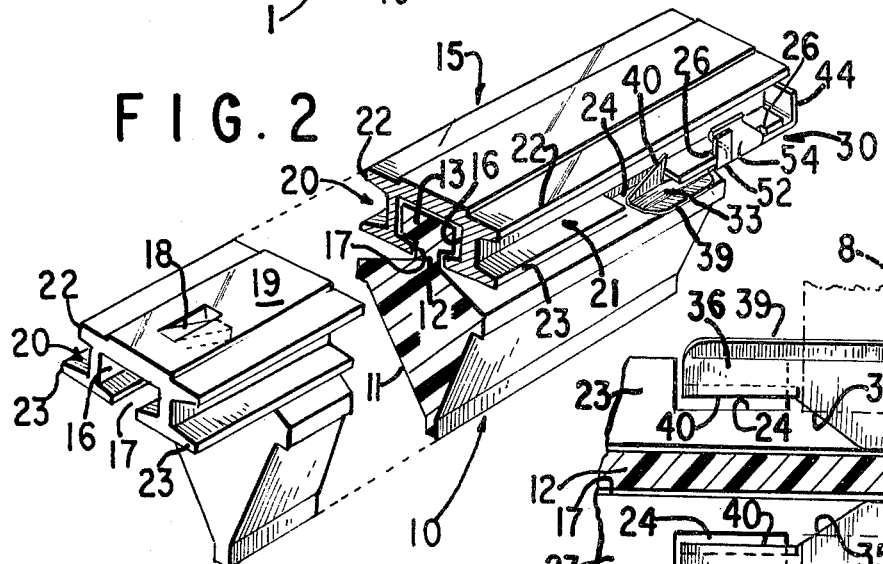
FIG.2
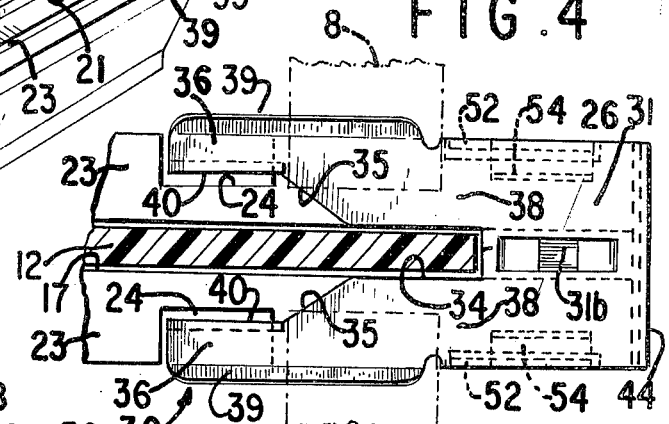
FIG.4
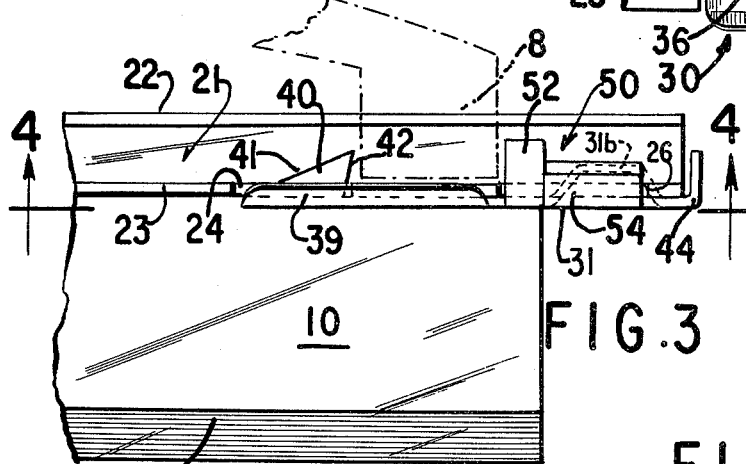
FIG.3
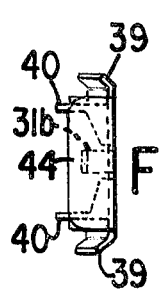
FIG.5
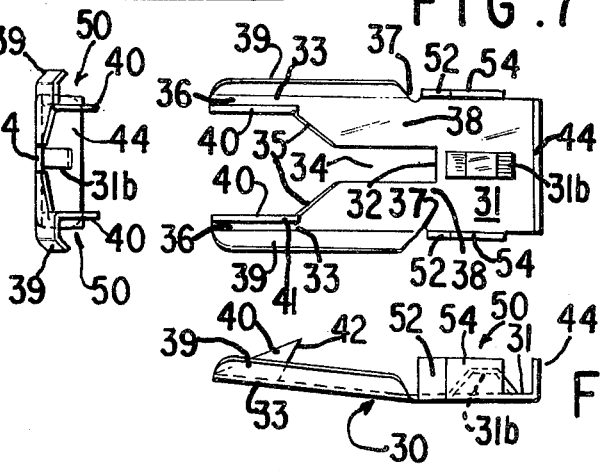
FIG.7
FIG.9    FIG.8
FIG.6

WIPER BLADE UNIT WITH FASTENING CLIP

This invention relates to windshield wipers and, more particularly, to a replaceable wiper blade unit and a component fastening clip.

Windshield wipers for use on curved vehicle windshields typically comprise a pressure distributing wiper blade holder, often termed a "superstructure", which holds and bears resiliently against a wiper blade unit through sets of claws carried by bowed yoke portions of the holder. The blade unit often includes a strip-like backing member supporting an elastic wiper blade and engaged slidably with the claws, with a resilient clip on the backing member for fastening it detachably to a set of the claws so as to hold the blade unit securely in working position.

In certain wiper blade units recently provided, e.g., as described in U.S. Pat. No. 3,919,736, the backing strip is constituted by a length of an extrusion of a stiff resilient thermoplastic resin, which has a longitudinally hollow central portion slotted along its bottom to receive and retain slidably the head and neck portions, respectively, of an elastic wiper blade and has laterally open channels on opposite sides of the strip body, each defined by upper and lower flanges thereon, to receive slidably, confine and bear pressure from the claws of the blade holder.

The fastening of the blade unit in the blade holder as described in the cited patent is effected by a resilient clip that is a unitary molding of a stiff resilient thermoplastic resin. This clip is fitted onto one end of the backing strip by finger and tongue portions which protrude from a base portion of the clip into end portions of the channels and hollow, respectively, of the backing strip. Resilient legs of the molded clip extend forwardly beneath the lower flanges of the backing strip, presenting on their ends upstanding, claw engaging lugs which protrude into the strip channels through openings in the lower flanges.

The assembling of the described molded clip onto an end of the backing strip requires the parts to be first interengaged in an angled relationship and then pushed together with changes of their relative positions until they are aligned and fully engaged. This procedure is difficult to carry out by automated equipment. Additionally, in order to fix the clip inseparably to the backing strip, a solvent or other means is utilized for fusing some of the mating surfaces together, thus adding steps to the production process. Further, a blade unit provided with the molded plastic clip may differ noticeably from others when it is being mounted for use in a blade holder having metal claws, due to a drag on such claws being noticeable as they are pressed against the upstanding lugs of the clip so as to depress and pass over these lugs for fastening engagement.

It is an object of the present invention to provide a wiper blade unit with a fastening clip that can be easily assembled inseparately to the backing strip with the avoidance of steps needed for assembly of the above mentioned molded clip.

Other objects of the invention are to provide a wiper blade unit, or blade refill, with a fastening clip that will fit and engage easily onto claws of any of the common designs or forms of wiper blade holders, whether the holder is made of metal or of plastic material, and, further, to provide a clip structure that securely prevents engaged claws from escaping its claw engaging lugs.

The wiper blade unit herein set forth is similar to some of the known blade units in that its backing strip is constituted by a length of a stiff resilient extrusion having a longitudinally hollow central portion slotted along its bottom for receiving the head and neck portions, respectively, of an elastic wiper blade, and having along its opposite sides laterally open channels, each defined by upper and lower lateral flanges, to receive slidably, confine and bear pressure from the claws of a pressure applying wiper blade holder. Also, a resilient clip is secured to one end of the backing strip for fastening it detachably to a set of the claws by means of claw engaging elements that protrude upwardly into the strip channels through openings formed in the lower flanges.

According to the present invention, the resilient fastening clip provided on one end of the backing strip is a unitary piece of sheet metal formed to comprise a base portion to underlie an end portion of the backing strip, two resilient legs each of which extends forwardly from the base portion beneath one of the lower flanges and has along a forward portion of the leg an upturned ridge portion, preferably of especially raked form, adapted to protrude into a strip channel through one of the said openings for latching engagement with one of the blade holder claws, and side structure turned upwardly from opposite edges of the said base portion provide oppositely disposed fingers which, by being crimped over and upon portions of the lower strip flanges, fix the clip tightly to the backing strip.

The side structures turned up from the base portion preferably provide not only the fingers which grip the lower strip flanges but also claw abutting fingers which protrude into the strip channels at a certain distance backward from the claw engaging ridge portions on the clip legs.

The fastening clip herein set forth can be formed simply by stamping a metal blank from suitable sheet metal, such as a strip of stainless steel, and deforming portions of the blank upwardly along edges of its base portion and its legs. The clip so formed can be assembled securely with a blade backing strip simply by holding it against an end and bottom portion of the backing strip and deforming the fingers of the upturned side structures to proper locations over the lower flanges of the backing strip, as by a lateral press operation. All these operations are readily amenable to being performed by automated machinery.

The above mentioned and other objects, features and advantages of the invention will be further evident from the following detailed description and the accompanying drawings of an illustrative embodiment of the invention. In the drawings:

FIG. 1 is a side elevational view of the wiper blade unit assembled for use in the blade-carrying claws of a windshield wiper blade holder;

FIG. 2 is an enlarged perspective view of the blade unit, partly broken away and partly in section;

FIG. 3 is an enlarged side elevational view of an end portion of the blade unit;

FIG. 4 is a transverse sectional view taken at line 4—4 of FIG. 3;

FIG. 5 is an enlarged plan view of a metal blank for forming the fastening clip;

FIG. 6 is an enlarged side elevational view of the fastening clip in the form obtained by bending up portions of the metal blank;

FIG. 7 is an enlarged plan view of the same;

FIG. 8 is an enlarged elevational view of one end thereof; and

FIG. 9 is an enlarged elevational view of the other end thereof.

The windshield wiper assembly shown in FIG. 1 comprises a wiper blade unit 1 fitted onto a pressure distributing blade holder which may be of any of the several forms or types commonly used for automobile windshields. The blade holder 2 as shown corresponds to that disclosed in U.S. Pat. No. 3,928,887. It includes a primary yoke 3 that can be connected through a coupler 4 to a wiper arm 5 and two secondary yokes 6 and 7 each of which is connected pivotably to an end of the primary yoke. The secondary yokes have on their ends sets of claws 8 engaged slidably with the blade unit for supporting the blade unit and applying to it wiping pressure derived through the wiper arm.

The wiper blade unit 2 consists of an elastic wiper blade 10, a flexible backing strip 15 and a resilient clip 30 fixed to one end of the strip. The wiping blade, strip and clip normally are united inseparably when completely assembled, constituting a unit that can be either fitted onto a blade holder as an original component of a windshield wiper assembly or supplied as a replacement unit, or blade refill, for any of the common forms of automobile windshield wipers.

The elastic wiper blade 10 in the form shown is a molded or extruded length of a flexible elastomeric material, e.g., rubber, having a longitudinal wiping portion 11 of generally V-shaped cross-sectional outline, which is connected with bulbous head portion 13 through a neck portion 12 of reduced diameter.

The backing strip 15 is a length of a relatively stiff, resilient extrusion which is flexible in the direction of the forces applied to it through the claws 8. It is composed of a thermoplastic resin characterized by high impact strength and a high softening temperature, such, for example, as a polycarbonate resin impregnated with carbon black. The central portion of the strip 15 forms a hollow 16 which extends longitudinally from end to end of the strip and is slotted at 17 along the bottom thereof so that the wiper blade 10 may be mounted in the backing strip by sliding movement of its head portion 13 and neck portion 12 into an end of and along the hollow 16 and slot 17 of the backing strip. The elastic blade so inserted may be prevented from sliding out of the strip end that received it by an end structure of any suitable form. For instance, a portion 18 of the top wall 19 of the strip 15 may be struck down into the hollow 16 to form a tongue that abuts an end to head portion 13 of the wiper blade.

The backing strip 15 is formed along its opposite sides with upper and lower lateral walls or flanges 22 and 23 which extend integrally from the central portion of the strip and define laterally open channels 20 and 21 to receive slidably, confine, and sustain pressure from the ends of the claws, such as claws 8, of the wiper blade holder. The lower flanges 23 each have an opening 24 formed therein near an end of the strip, as by a portion of the flange being cut out at a location suited for receiving a flange portion of the fastening clip 30. Each lower flange 23 is also provided with a shallow rectangular notch 26 in its edge (FIG. 4) at a location between the opening 24 and the adjacent end of the backing strip for engagement by an upturned protrusion of the clip as hereinafter described. The flanges 22 and 23 stiffen the backing strip sufficiently to keep it from flexing transversely in their own plane, while permitting it to be flexed in directions perpendicular to the windshield surface.

The fastening clip 30 is formed as a unitary piece of a stiff resilient sheet metal, which may be cut or stamped to a required blank shape out of a strip of the metal and then bent to a form suited for assembly with the end of the backing strip 15 where the openings 24 and notches 26 are provided. The clip may be composed, for instance, of a sheeted stainless steel, A.I.S.I. No. 430, having a thickness of approximately 0.0195 in. A piece of the sheet metal is first stamped out to the form of a blank as shown in FIG. 5, which then is deformed to provide the clip as it is shown in FIGS. 6 to 9 for assembly with the end of the backing strip. The assembling of the clip with the strip end can then be effected simply by holding the parts firmly together, with the clip seated up to the bottom of the lower strip flanges 23, and crimping upturned finger portions of the clip base over the lower flanges as described more fully hereinafter. The relationship of the structures of the formed and assembled clip 30 to structures of the backing strip 15 will be evident from the enlarged views in FIGS. 2, 3 and 4 of the drawing.

In the resulting wiper blade unit, the clip 30 presents a base portion 31 that underlies an end portion of the backing strip 15 and two resilient legs 33 each of which extends forwardly from the base portion beneath one of the lower flanges 23. The legs 33 are spaced apart ahead of the forward edge 32 of base porion 31 to provide a slotway 34 which, as can be seen in FIG. 4, accommodates an end of the neck portion 12 of the wiper blade mounted in the backing strip and, by edge 32 at its end, prevents movement of the blade 10 out of the backing strip at the strip end fitted with the fastening clip.

Each of the legs 33 has its inner edge sloped outwardly at 35 from the slotway 34 to a location directly beneath the opening 24 in the adjacent lower flange 23. At that location, a forward portion 36 of each leg has along its inner edge an upturned ridge portion 40, of wedge-like shape, which normally protrudes upwardly through the flange opening 24 into the related channel 20 or 21 of the backing strip. Each ridge portion 40, as may be seen in FIGS. 3 and 6, presents in its strip channel a forward edge 41 that is sloped upwardly and backwardly so that it is readily depressable by relative movement against this edge of the end of one of the endmost claws 8 of the blade holder 1. The forward edge 41 extends to the top of the ridge portion 40, where it meets a backward edge 42 thereof that is raked at an acute angle to the longitudinal axis of the channel 20 or 21. The backward edge 42, for instance, extends upwardly from the inner edge of the forward leg portion 36 at a slightly acute angle thereto, e.g., of about 80°. It results, as will become further evident below, that when a claw 8 has been engaged behind the ridge portion, as by being moved against and beyond the sloped forward edge 41, the raked backward edge 42 will engage with the claw so as to prevent the claw from escaping the hold of the fastening clip.

The base portion 31 of the clip is formed at 50 with side structures, or protrusions, which are turned upwardly from its opposite sides at a location directly backward from the legs 33 and provide oppositely disposed fingers that are crimped over and upon portions of the lower flanges 23 so as to grip the clip tightly to the backing strip. In the illustrated form of the clip, each side structure 50 is constituted by a lateral protrusion 50a on the metal blank 30a (FIG. 5), which is lanced so as to split it into two finger portions 52 and 54 and is located so that, when turned upward, these finger portions at either side of the clip engage into the notches 26 formed in edges of the lower flanges 23 of the backing strip.

The backward finger portions 54, which desirably are somewhat wider so stronger than the forward fingers 52, are crimped over and tightly down upon the lower flanges 23 when the clip is assembled to the backing strip, thus for all practical purposes securing the clip inseparably to the backing strip. The forward finger portions 52, as may be seen in FIG. 2, are bent over the lower flanges to a location where they protrude into the related backing strip channels so as to define a limited space in each channel for receiving and confining a claw 8 engaged behind the leg ridge portion 40 therein.

The base portion 31 has an upstanding bridge portion 31b formed centrally in it in a position to extend upwardly through the slot 17 into the hollow 16 of the backing strip. This bridge portion, by fitting into the slot 17, abuts the lower flange portions which border the slot, thus aiding in holding the engaged end portion of the backing strip to its proper shape and against being distorted by mechanical forces as the fingers 54 of the side structures 50 are crimped over and down upon the lower flanges 23.

At the junctions between the outer edges of the base portion 31 and the legs 33 of the clip, the metal of the clip is cut away, or recessed, as shown at 37 to provide leg regions 38, near the root of the legs, which possess a desired degree of elastic resilience. Beyond the recesses 37, each of the legs 33 is formed along its outer edge with a ledge portion 39 which slopes laterally upwardly and outwardly from beneath the adjacent lower flange 23 of the backing strip. Each ledge portion 39 thus is accessible to be engaged and depressed by a person's finger, so that the legs can be displaced downwardly by hand against the resistance of the resilient leg regions 38 whenever desired in order to move the ridge portions 40 out of the strip channels, thereby releasing a set of claws 8 engaged behind the ridge portions.

The clip 30 desirably is formed also with an upstanding end wall 44 along its backward end edge. This end wall partially overlies ends of the hollow 16 and the channels 21 and 22 at an end of the backing strip, providing an abutment for the strip end which aids in the relative positioning of the clip and the strip for assembling these parts of the wiper blade unit.

Referring to FIG. 6 of the drawing, it will be seen that the formed clip 30 before being assembled with the backing strip has its legs 33 prebent upwardly relative to the base portion 31. A permanent bend is set in the resilient leg regions 38 so that the legs slope upwardly at an angle, for instance, of about 5 degrees to the plane of the base portion 31. It results that when the clip is assembled with the end of the backing strip by being pressed tightly against it and fixed in place by crimping of the fingers 54 upon the lower strip flanges, the clip legs are displaced elastically against the resilience of their prebent regions 38. The legs thus are constantly biased upwardly against the lower flanges of the backing strip, and constantly urge the ridge portions 40 to their uppermost position in the strip channels 21 and 22.

The portions of the metal blank 30a (FIG. 5) which are turned upwardly to form the described portions of the fastening clip are indicated by corresponding reference numbers bearing the suffix a. The broken lines in FIG. 5 indicate the approximate locations of the bend lines to be formed.

While the invention has been described and illustrated with reference to the particulars of a preferred form of embodiment thereof, it will be apparent that the new features herein set forth are not restricted to the illustrated embodiment but may also be employed in various other forms. For instance, although the clip 30 is shown and described as being made with two similar legs 33 which present ridge portions 40 in both of the backing strip channels for engagement with both of the claws of a claw set on the blade holder, the new features and advantages of the invention would be largely retained if one of the two legs were omitted from the clip.

I claim:

1. In a windshield wiper blade unit including a flexible backing strip constituted by a length of a stiff resilient extrusion, said strip having a longitudinal hollow slotted along its bottom for receiving slidably the head and neck portions, respectively, of an elastic wiper blade and having along its opposite sides laterally open channels, each defined by upper and lower lateral flanges thereon, for receiving slidably, confining and bearing pressure from the claws of a pressure-applying wiper blade holder, and a resilient clip secured to one end of said strip for fastening it detachably to a set of said claws, said lower flanges having openings therethrough near said one end and said clip having claw engaging elements that protrude into said channels through said openings, the improvement which comprises said clip being a unitary piece of resilient sheet metal formed to comprise a base portion underlying an end portion of said strip, two resilient legs extending forwardly from said base portion beneath said lower flanges and each having along a forward portion of the leg an upturned ridge portion protruding through one of said openings into the related strip channel for engagement with one of said claws, and side structures turned upwardly from opposite side edges of said base portion and providing oppositely disposed fingers which are crimped over and upon portions of said lower flanges so as to grip said base portion tightly to said strip.

2. A blade unit according to claim 1, each said ridge portion having a forward edge sloped upwardly and backwardly in its said channel, whereby it is readily depressable by relative movement of one of said claws against said edge, and having a backward edge raked at an acute angle to the longitudinal axis of said channel to prevent escape of a claw engaged behind said ridge portion.

3. A blade unit according to claim 2, said backward edge extending upwardly from the inner edge of said forward portion of said leg at an acute angle thereto.

4. A blade unit according to claim 1, said legs being prebent upwardly relative to said base portion so that they are constantly biased against said lower flanges.

5. A blade unit according to claim 1, each said ridge portion being turned upwardly along the inner edge of said forward leg portion, each said leg having along its outer edge a ledge portion sloped upwardly and laterally outside the adjacent lower flange for engagement by a person's finger, whereby said legs are depressable by hand to release a set of claws engaged behind said ridge portions.

6. A blade unit according to claim 1, said lower flange portions having notches formed in their edges and said fingers being engaged in said notches to prevent displacement of said clip longitudinally of said strip.

7. A blade unit according to claim 1, said side structures each comprising a protrusion split into two finger portions at least one of which constitutes one of said crimped fingers and one of which protrudes into the related strip channel to limit movement of a claw engaged behind a said ridge portion.

8. A blade unit according to claim 1, said base portion having an upstanding end wall thereon along its backward end edge to overlie ends of said hollow and said channels and limit the position of said clip relative to said one end of said strip.

9. In a windshield wiper blade unit including a flexible backing strip constituted by a length of a stiff resilient extrusion, said strip having a longitudinal hollow slotted along its bottom for receiving slidably the head and neck portions, respectively, of an elastic wiper blade and having along its opposite sides laterally open channels, each defined by upper and lower lateral flanges thereon, for receiving slidably, confining and bearing pressure from the claws of a pressure-applying wiper blade holder, and a resilient clip secured to one end of said strip for fastening it detachably to a set of said claws, said lower flanges having openings therethrough near said one end and said clip having claw engaging elements that protrude into said channels through said openings, the improvement which comprises said clip being a unitary piece of resilient sheet metal formed to comprise a base portion underlying an end portion of said strip, two resilient legs extending forwardly from said base portion beneath said lower flanges and each having along a forward portion of the leg an upturned ridge portion protruding through one of said openings into the related strip channel for engagement with one of said claws, and side structures turned upwardly from opposite side edges of said base portion and each comprising a protrusion split into two finger portions at least one of which is crimped over and upon a portion of said lower flange so as to grip said base portion tightly to said strip and one of which protrudes into the related strip channel to limit movement of a claw engaged behind a said ridge portion, said lower flange portion having a notch formed in its edge and said protrusion being engaged in said notch to prevent displacement of said clip longitudinally of said strip, each said ridge portion having a forward edge sloped upwardly and backwardly in its said channel, whereby it is readily depressable by relative movement of one of said claws against said edge, and having a backward edge raked at an acute angle to the longitudinal axis of said channel to prevent escape of a claw engaged behind said ridge portion, said legs being prebent upwardly relative to said base portion so that they are constantly biased against said lower flanges, each said ridge portion being turned upwardly along the inner edge of said forward leg portion, each said leg having along its outer edge a ledge portion sloped upwardly and laterally outside the adjacent lower flange for engagement by a person's finger, whereby said legs are depressable by hand to release a set of claws engaged behind said ridge portions, said base portion having an upstanding end wall thereon along its backward end edge to overlie ends of said hollow and said channels and limit the position of said clip relative to said one end of said strip.

10. A resilient clip adapted to be secured to one end of the backing strip of a windshield wiper blade unit for fastening the blade unit detachably to a set of claws of a pressure-applying wiper blade holder, said backing strip having along its opposite sides laterally open channels each defined by upper and lower lateral flanges thereon, for receiving slidably, confining and bearing pressure from said claws, said lower flanges each having an opening formed therethrough near said one end, said clip being a unitary piece of resilient sheet metal formed to comprise a base portion for underlying an end portion of said strip, two resilient legs to extend forwardly from said base portion beneath said lower flanges and each having along a forward portion thereof an upturned ridge portion to protrude through one of said openings into the related strip channel for engagement with one of said claws, and side structures turned upwardly from opposite side edges of said base portion and providing oppositely disposed fingers to be crimped over and upon portions of said lower flanges so as to grip said base portion tightly to said strip.

11. A resilient clip according to claim 10, each said ridge portion being turned upwardly along the inner edge of said forward leg portion and having a forward edge sloped upwardly and backwardly from said inner edge, whereby the ridge portion is depressable by relative movement of one of said claws against said forward edge, and having a backward edge extending upwardly from said inner edge at an acute angle thereto for preventing escape of a said claw engaged behind the ridge portion.

12. A resilient clip according to claim 11, said legs being prebent upwardly relative to said base portion so that when the latter is gripped to said strip they will be constantly biased against said lower flanges.

13. A resilient clip according to claim 11, each said leg having along its outer edge a ledge portion sloped upwardly and laterally from its plane to lie outside an adjacent lower flange for engagement and displacement by a person's finger to release a claw engaged behind said ridge portion.

* * * * *